Aug. 15, 1961
C. K. LEEPER
2,995,891
FUEL CONTROL SYSTEM
Filed June 26, 1952
3 Sheets-Sheet 1
FIG. 1.
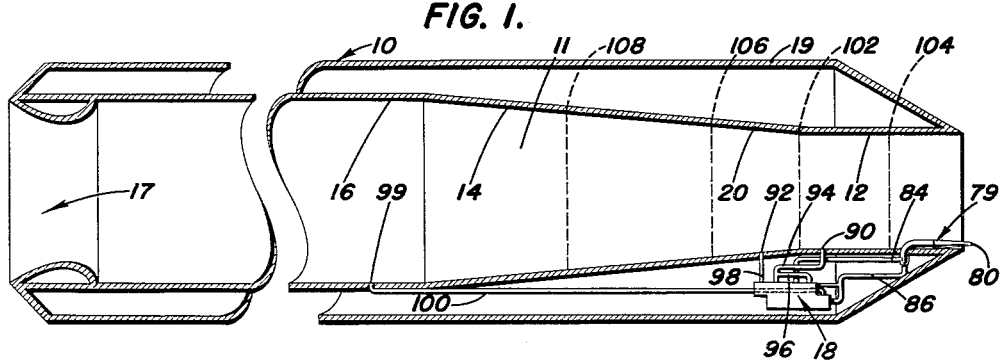
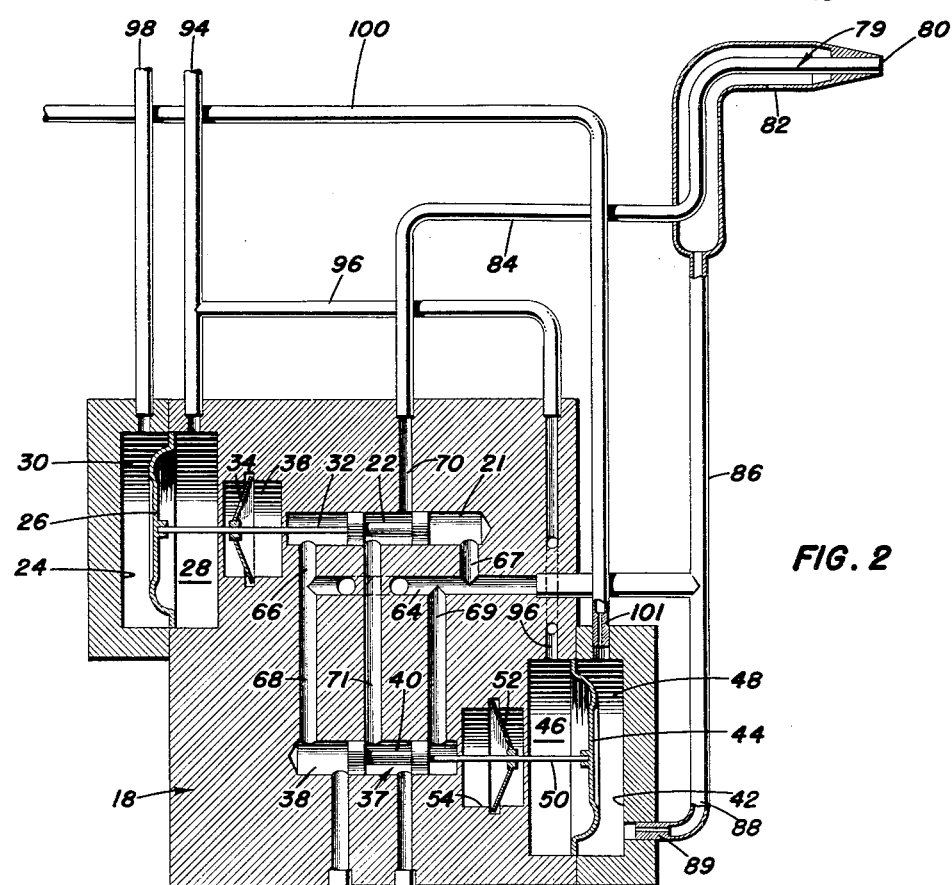
FIG. 2
CHARLES K. LEEPER
INVENTOR.
BY
ATTORNEYS

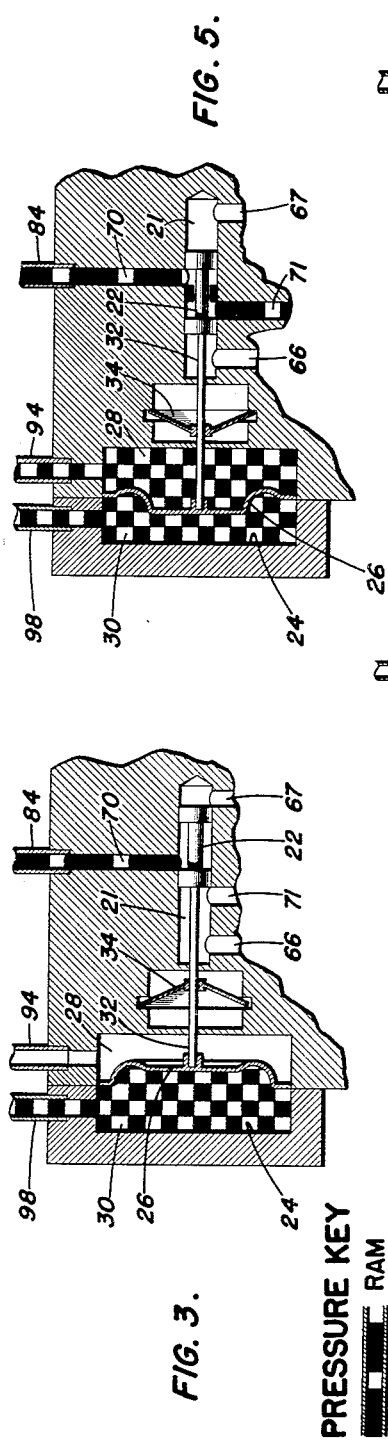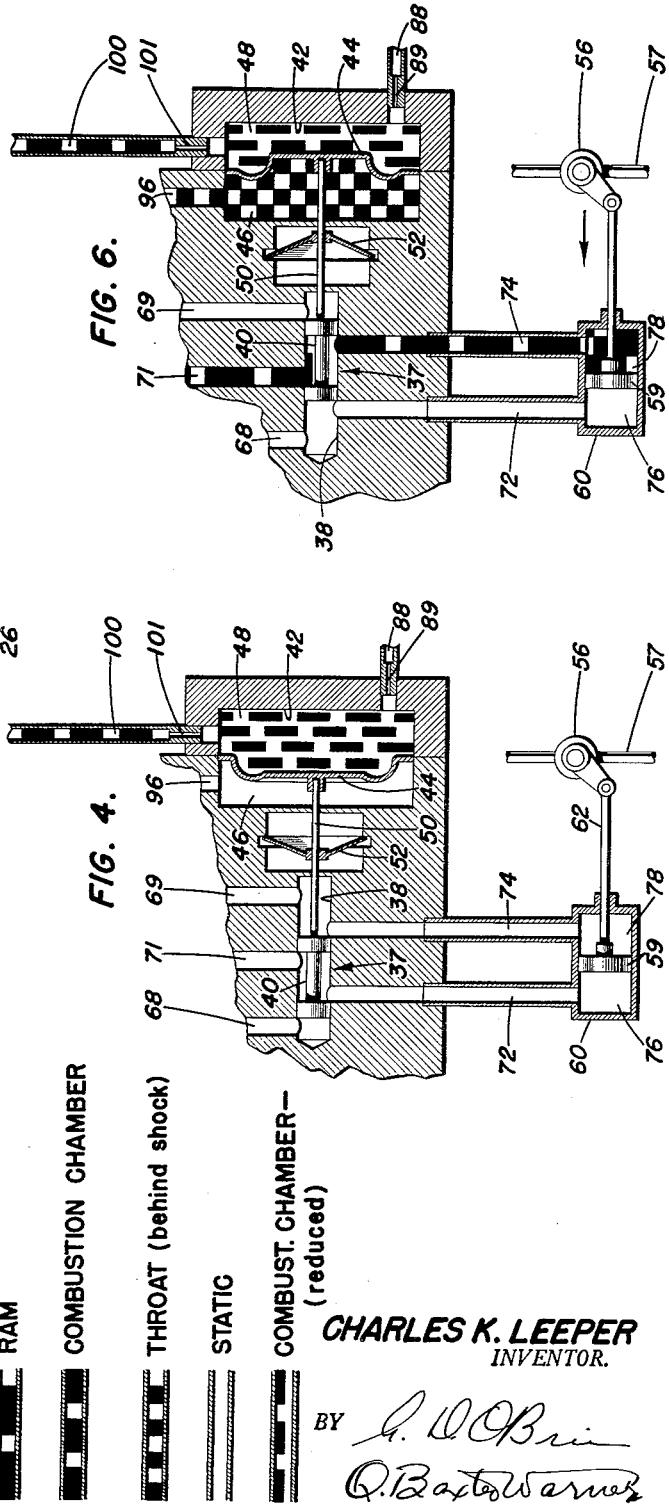

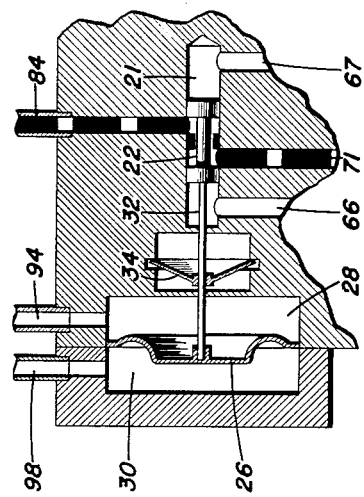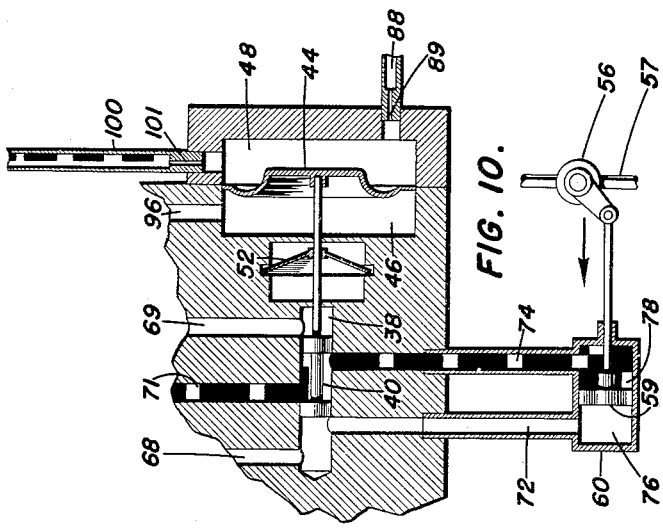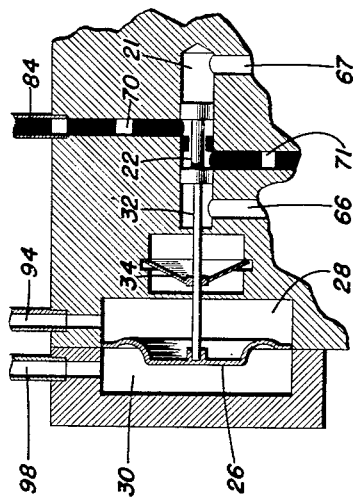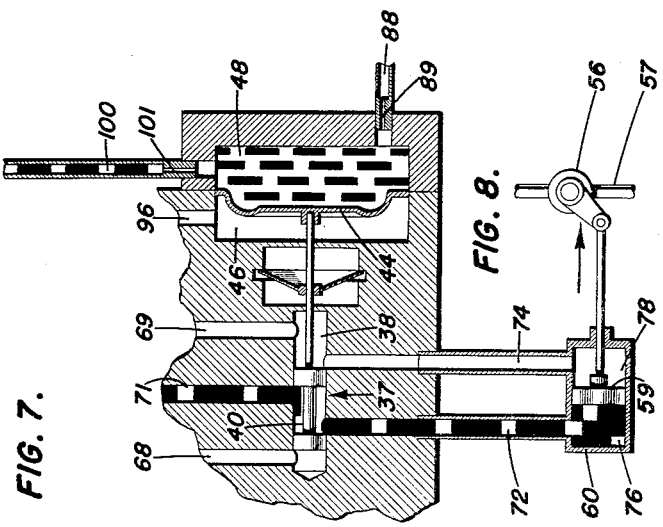
CHARLES K. LEEPER
*INVENTOR.*
BY
ATTORNEYS

2,995,891
FUEL CONTROL SYSTEM
Charles K. Leeper, Cambridge, Mass., assignor to the United States of America as represented by the Secretary of the Navy
Filed June 26, 1952, Ser. No. 295,633
5 Claims. (Cl. 60—35.6)

The present invention relates generally to an improved fuel control system and apparatus for a ramjet type of aerial missile. More particularly, the invention relates to a fuel metering valve control system and apparatus for a ramjet type of aerial missile which employs the position of the shock wave in or in front of the duct of the ramjet and the pressure in the combustion chamber thereof to provide the primary control impulses.

In a properly functioning ramjet, a shock wave is found either at some point in the duct or at some point ahead of the duct of the ramjet. The exact location is dependent on the speed of the ramjet. Excess pressure in the combustion chamber forces the shock wave forward away from its best position; while insufficient pressure permits the shock wave to move rearwardly of that position. Shifting of the shock wave is caused by having improper air-fuel mixtures.

For a constant air mass flow through a ramjet designed to operate at a stoichiometric air-fuel ratio, an increase or decrease in fuel will cause a decrease in the pressure in the combustion chamber. On the other hand, if the air mass flow through the ramjet is increased, the original stoichiomtric air-fuel ratio is changed, and an increased air-fuel ratio (leaner mixture) is obtained, thereby decreasing the pressure in the combustion chamber upon burning of the new air-fuel mixture. This decrease in pressure causes the shock wave to move rearwardly into the ramjet duct. In order to increase the pressure in the combustion chamber, it is necessary to add additional fuel to reduce the increased air-fuel ratio mentioned above to the proper stoichiometric ratio for the new air mass flow condition, thereby again increasing the pressure in the combustion chamber upon burning of the new air-fuel mixture. An increase in pressure in the combustion chamber operates to move the shock wave back to its optimum position.

If the mass air flow through the ramjet is decreased below the mass air flow rate that the ramjet is designed for, then a decreased air-fuel ratio (richer mixture) is obtained. Upon burning of this new mixture, a decreased pressure is obtained in the combustion chamber, with a waste of fuel. In order to correct for this, the amount of fuel is reduced to the stoichiometric ratio for the reduced mass air flow rate.

Accordingly, an object of this invention is to provide a metering valve control system and apparatus which, in addition to controlling the air-fuel mixture in normal operation to position the shock wave, properly responds to burner-chamber pressure in such a manner as to produce the desired lean mixture for reignition in the event that burning stops.

Another object of the invention is to provide a metering-valve control system and apparatus which is controlled by the position of the shock wave and the pressure in the combustion chamber, and which utilizes the difference between the pressures on the two sides of the shock wave, the combustion-chamber pressure, and the stagnation pressure furnished by a Pitot tube for control and power purposes.

And another object of the invention is to provide a metering valve control system and apparatus which is economical to manufacture, easy to install in an aerial missile, and which is reliable in operation.

Other objects and many of the attendant advantages of this invention will be readily appreciated as the same becomes better understood by reference to the following detailed description when considered in connection with the accompanying drawings wherein:

FIG. 1 is a schematic view of a ramjet type of aerial missile, embodying the system and apparatus of the invention;

FIG. 2 is an enlargement of the system and apparatus illustrated in FIG. 1, in greater detail;

FIG. 3 is a detail sectional view of the apparatus shown in FIG. 2, particularly illustrating the primary valve mechanism under the condition of normal burning;

FIG. 4 is a detail sectional view of the apparatus shown in FIG. 2, particularly illustrating the secondary valve mechanism under condition of normal burning;

FIG. 5 is a detail sectional view of the apparatus shown in FIG. 2, particularly illustrating the primary valve mechanism under condition of excess fuel flow;

FIG. 6 is a detail sectional view of the apparatus shown in FIG. 2, particularly illustrating the secondary valve mechanism under the condition of excess fuel flow;

FIG. 7 is a detail sectional view of the apparatus shown in FIG. 2, particularly illustrating the primary valve mechanism under condition of insufficient fuel flow;

FIG. 8 is a detail sectional view of the apparatus in FIG. 2, particularly showing the secondary valve mechanism under condition of insufficient fuel flow;

FIG. 9 is a detail sectional view of the apparatus in FIG. 2, particularly showing the secondary valve mechanism under no-burning and reignition conditions; and FIG. 10 is a detail sectional view of the apparatus shown in FIG. 2, the secondary valve mechanism under no-burning and reignition conditions.

In accordance with the invention, an air-pressure actuated double piston-valve system is provided for controlling a fuel-metering valve in a super-sonic ramjet type of aerial missile. The piston-valve system utilizes the pressure differential existing between either side of the shock wave located either in front of or within the duct in the forward portion of the missile, and also the combustion chamber pressure as well as the Pitot tube pressure, the latter pressure being taken at a point forward of the front tip of the missile.

Referring now to FIG. 1, there is shown an aerial missile 10 of the ramjet type which contains a central duct 11 having a throat 12, a frusto-conical diffuser 14, a combustion chamber 16, and an exit nozzle section 17.

A metal block 18, shown generally in FIG. 1 and in detail in FIG. 2, forms the base of the control apparatus and is mounted in a convenient position in the ramjet; for example, between the outer and inner walls 19 and 20 of the missile 10. A primary valve chamber 21 in the block 18 houses a piston valve 22. A chamber 24 coaxial with the valve chamber 21 is spanned by a diaphragm 26 which divides it into inner and outer compartments 28 and 30. Diaphragm 26 is connected to the valve 22 by a piston rod 32. Spring 34, of the Belleville type, is located in a spring chamber 36 between the valve chambers 21 and 24, is fastened to the piston rod 32 and serves to control the motion of the piston valve 22, and, at rest, holds the valve assembly in the outer position (to the left) as indicated in FIG. 2. Spring 34 is reversible under load and capable of self-restoration upon release of the load.

A similar secondary valve system 37 is also provided. This system 37 includes a valve chamber 38, a piston valve 40, a diaphragm chamber 42 subdivided by a diaphragm 44 into inner and outer compartments 46 and 48, a piston rod 50, a Belleville spring 52 similar to the aforementioned spring 34, and a spring chamber 54. When the spring 34 is at rest, it holds the valve assembly in the outer position (to the right), also as indicated in FIG. 2.

A metering valve 56 in the fuel line 57 from a fuel chamber of the ramjet is actuated by a piston 59 operating in a cylinder 60 and connected to the valve 56 by a rod 62.

A manifold 64 in the block 18 communicated with the extremities of the valve chambers 21 and 38 by means of vents 66, 67, 68 and 69. A supply duct 70 communicates with the primary valve chamber 21 and the middle section of the valve 22 therein, a transfer duct 71 from chamber 21 and controlled by the valve 22 forms the inlet to the secondary valve chamber 38 and the middle section of the valve 40 therein, and inlet ducts 72 and 74 from the chamber 38 and controlled by the valve 40 lead to the left- and right-hand ends 76 and 78 of the valve-operating cylinder 60, respectively.

A Pitot-tube assembly 79 having a dynamic- or ram-pressure orifice 80 and a static-pressure orifice 82 is mounted on, and projects forwardly from, the extreme forward end of the ramjet missile 10. The ram-pressure orifice 80 is connected to the supply duct 70 by a tube 84; and the static-pressure orifice 82 is connected to the manifold 64 by a tube 86 and to the outer compartment 48 of the secondary valve system by a tube 88 having a constriction 89.

A pair of longitudinally spaced orifices 90 and 92 are placed at the location determined to be best for the shock wave in normal operation. The front orifice 90 is connected to the inner compartment 28 of the primary valve mechanism by a tube 94 and, by a branch tube 96, to the inner compartment 46 of the secondary valve mechanism, while the rear orifice 92 is connected to the outer compartment 30 of the primary valve mechanism by a tube 98. An orifice 99 in the wall of thte combustion chamber 16 is connected to the outer compartment 48 of the secondary valve system by a tube 100 having a constriction 101.

Referring now to FIGS. 1, 2, 3 and 4, in normal operation the shock wave is located at 102, between the orifices 90 and 92. The static pressure ahead of the shock wave at the front orifice 90 is approximately equal to the ambient static pressure as determined at the orifice 82 of the Pitot-tube assembly, while that behind the shock wave at the orifice 92, due to the reduced velocity of the air, is considerably higher, but, by reason of its flow, not as high as the ram pressure determined at the ram-pressure orifice 80 of the Pitot-tube assembly.

Under these conditions, the diaphragm 26 is subjected, on its inner side, to a low pressure from the orifice 90 applied through the tube 94 and the compartment 28, and, on its outer side, to a high pressure from the orifice 92 applied through the tube 98 and the outer compartment 30. As a result of the unbalance of pressures acting on the diaphragm 26, it is deflected inward and pushes the piston rod 32 and the primary piston valve 22 to the position shown in FIG. 3 from the initial, unloaded position shown in FIG. 2. In so moving the piston valve 22, the Belleville spring 34 is deflected and reversed in shape as shown. With the piston valve 22 in the inward position, the inner head thereof is outward and clear of the end of the transfer duct 71 while the outer head is inward of the vent 67 leading to the static-pressure manifold 64, thus holding the ram-pressure air supplied by the tube 84 and the supply duct 70 in the middle portion of the piston valve 22 and providing communication between the transfer duct 71 and the static pressure manifold 64 by way of the central section of the valve chamber 21.

Simultaneously, the pressure in the inner compartment 46 of the secondary valve mechanism is the pressure ahead of the shock wave, approximately the same as ambient static pressure, by reason of the connection, from the orifice 90 to the inner compartment 46 through the tubes 94 and 96, and the combustion-chamber pressure is supplied from the orifice 99 in the combustion chamber 16 through the tube 100 to the constriction 101 therein. The constriction 101 and the constriction 89 in the ambient-static-pressure tube 88 leading from the outer compartment 48 together act to reduce the pressure in compartment 48 to a value lower than that in the combustion chamber 16 and the tube 100, and equal to, or just lower than, the pressure behind the shock wave.

As a result of the unbalance of pressures acting on the diaphragm 44, it is deflected inward and pushes the piston rod 50 and the piston valve 40 to the position shown in FIG. 4 from the initial, unloaded position shown in FIG. 2. In so moving the piston valve 40, the Belleville spring 52 is deflected and reversed in shape as shown. With the valve 40 in this position, the heads of the piston valve 40 are inwardly located with respect to the upper ends of the inlet ducts 72 and 74. Thus the pressures on the valve-operating piston 59 are equalized, the left-hand end 76 of its cylinder 60 being vented through the inlet duct 72, the central section of the piston valve 40, the transfer duct 71, the outer end of the primary valve chamber 21 and the vent 66 to the manifold 64, and the right-hand end 78 being vented through the inlet duct 74, the outer end of the valve chamber 38 and the vent 69 to the manifold 64, and friction holds the fuel-metering valve 56 motionless.

Referring now to FIGS. 5 and 6, as well as to FIGS. 1 and 2, when during operation, a condition occurs in which the fuel flow is greater than normal, the pressure in the combustion chamber 16 increases and the shock wave is driven to some position 104 forward of the orifice 90 (FIG. 1). In this case, the pressure at the orifice 90 is the same as that at the orifice 92; namely, the high pressure behind shock. Under this condition, the pressures on the opposite sides of the diaphragm 26, in the compartments 28 and 30, are equal, and the Belleville spring 34 returns to its original shape, drawing the primary piston valve 22 to the position shown in FIG. 5.

With the primary piston valve 22 in the position shown in FIG. 5, the inner head of the valve is inward, or to the left, of the upper end of the transfer duct 71 thereby admitting ram-pressure air from the supply duct 70 and the center of the primary piston valve 22 to the center of the secondary piston valve 40 as shown in FIG. 6. Simultaneously, the high pressure from the orifice 90 is conveyed in tubes 94 and 96 to the inner compartment 46 of the secondary valve assembly, and the combustion-chamber pressure, reduced by the action of the constrictions 101 and 89, is introduced into the outer compartment 48. Since the pressures on the opposite sides of the diaphragm 44 are approximately equal because of the reduced action of the constrictions 101 and 89 on the combustion-chamber pressure, the Belleville spring 52 returns to its original shape, drawing the secondary piston valve 40 to its original outer position, as shown in FIGS. 2 and 6. In this position, the heads of the valve 40 are outward, or to the right, of the upper ends of the inlet ducts 72 and 74. Thus ram-pressure air from the transfer duct 71 is admitted by way of the middle of the piston valve 40 to the inlet duct 74 and through it to the right-hand end 78 of the valve-operating cylinder 60, and the left-hand end 76 of the cylinder is vented to the atmosphere through the inlet duct 72, the inner end of the secondary valve chamber 38, the vent 68, the manifold 64, the tube 86 and the static-pressure orifice 82. The greater pressure in the right-hand end 78 of the cylinder 60 acts on the piston 59 therein to force it to the left to close the fuel-metering valve 56 in fuel line 57 at a rate determined by the friction of the piston 59 in the cylinder 60.

Referring now to FIGS. 1, 2, 7 and 8, when fuel flow is less than normal, the pressure in the combustion chamber 16 decreases and the shock wave drops back to a position 106 rearward of the orifice 92. In this case again, the pressures at the orifices 90 and 92 are equal, and approximately the ambient static pressure, thus the pressures on the diaphragm 26 of the primary valve mechanism are balanced so the Belleville spring 34 takes its original shape and holds the piston valve 22 in the position shown in FIG. 7. Ram-pressure air is admitted from the supply duct 70 through the center of the primary piston valve 22 and the transfer duct 71 to the center of the secondary piston valve 40. At the same time, the pressure on the inner surface of the diaphragm 44 of the secondary valve mechanism is, by reason of the communication between the inner compartment 46 thereof with the orifice 90, approximately equal to the ambient static pressure. Since the diaphragm 44 is subjected, on its outer face, to the reduced combustion chamber pressure, it is deflected inward to move the piston valve 40 to its inner position. In this position, the valve 40 admits the ram-pressure air from the transfer duct 71 to the inlet duct 72 and the left-hand end 76 of the cylinder 60, and, at the same time, vents the right-hand end 78 through the inlet duct 74, the outer end of the valve chamber 38, the vent 69, and the manifold 64. The ram pressure in the left-hand end of the cylinder acts on the piston 59 to force it to the right to open the fuel-metering valve 56.

Referring finally to FIGS. 1, 2, 9 and 10, the pressure in the combustion chamber 16 drops rapidly if burning stops, and the shock wave moves rearward to a position 108 in the diffuser 14. As stated above, this position of the shock wave would cause the fuel valve to open to richen the mixture if it were not for the tube 100 connecting the orifice 99 in the wall of the combustion chamber 16 with the outer compartment 48 of the secondary valve mechanism, and the constrictions 101 and 89 associated therewith. However, a rich mixture is more difficult to ignite successfully than a lean mixture so provision is made to reverse the operation of the fuel-metering valve from opening to closing.

The constrictions 101 and 89 are so proportioned that, in the event of the burning ceasing, the pressure in the compartment 48 drops practically to the value of the ambient static pressure in the tube 88. This results in an approximate balance of pressures on the two surfaces of the diaphragm 44 which permits the Belleville spring 52 to resume its normal shape and move the piston valve 40 to its outer position where it admits ram-pressure air to the right-hand end 78 of the cylinder 60 to close the fuel-metering valve 56.

Metering-valve action in either direction, as described above, changes the air-fuel ratio in such a way as ultimately to bring the shock wave back to the position 102, between the orifices 90 and 92. When the shock wave reaches this position, the conditions shown in FIGS. 3 and 4 prevail and, as described in connection with these figures, motion of the metering valve ceases, holding the air-fuel ratio at the desired value.

Recapitulating the above, an aerial missile 10 of the ramjet type, after launching, continues along its trajectory under its own source of power developed by the burning of the fuel mixture in the combustion chamber 16 and the expansion of the liberated gases through the exit nozzle 17, which develop thrust forces to propel the missile 10.

As previously pointed out, a shock wave, such as 102, in FIG. 1 is found in the forward portion of the duct of the ramjet missile 10, or at some point ahead of the missile 10. By providing the air-pressure actuated double piston-valve system 18, and utilizing the pressure differential existing on either side of the shock wave, as well as the combustion chamber pressure and the pressure forward the front portion of the aerial missile 10 the flow of fuel past the fuel-metering valve 56 can be accurately controlled for various operating conditions to give the proper air-fuel ratios as the aerial missile 10 continues on its trajectory.

Obviously many modifications and variations of the present invention are possible in the light of the above teachings. It is therefore to be understood that within the scope of the appended claims the invention may be practiced otherwise than as specifically described.

What is claimed is:

1. In combination with a fuel valve for a ramjet missile, a control mechanism for adjusting said fuel valve to provide for optimum operation of said ramjet missile in flight, said control mechanism being actuated by static pressure taken in the combustion chamber, together with the static pressures ahead of and behind a shock wave created by said ramjet missile in flight.

2. In combination with a fuel valve for a ramjet missile having a throat, a control mechanism for adjusting said fuel valve to provide for optimum operation of said ramjet missile in flight, as indicated by the pressure in the combustion chamber and by the position of a shock wave created by said ramjet missile in flight, said shock wave being located in the vicinity of said throat, including pressure orifices in the throat, a combustion-pressure orifice, a source of ram-pressure air, a static-pressure orifice, a first piston valve, operating means for said first valve controllable by the air pressures supplied by the throat-pressure orifices, a second piston valve, operating means for said second valve controllable by the static pressure, the combustion pressure, and the forward throat pressure, and a cylinder having a piston located therein, said piston being operatively connected to said fuel valve, said first piston valve controlling the admission of ram-pressure air to said second piston valve, and said second piston valve, in turn, controlling the admission of said ram-pressure air to either end of said cylinder to actuate said piston so as to move said fuel valve in the proper direction.

3. An arrangement as set forth in claim 2, wherein said operating means for said piston valves comprises diaphragm elements.

4. In combination, a ramjet missile having a throat, a fuel valve, and means for adjusting said fuel valve to position a shock wave created by said missile while in flight for assuring optimum operation of said missile, including a first piston valve actuated by the air pressure in said throat of the missile, and a second piston valve operated by the combustion-chamber pressure in said missile, and a cylinder having a piston therein connected to said fuel valve, said first piston valve controlling the admission of ram-pressure air created by the flight of said missile to said second piston valve, said second piston valve controlling the admission of said ram-pressure to either end of said cylinder to actuate said piston so as to move said fuel valve in the proper direction.

5. In combination with a fuel valve for a ramjet missile, a control mechanism for adjusting the air-fuel mixture to produce optimum position of a shock wave created by said ramjet missile, said shock wave being located at or near the forward end of the duct of said ramjet missile, including a fuel-valve-operating piston and a cylinder, a first piston valve, a diaphragm for actuating said first piston valve, a diaphragm chamber, a snap spring associated with said piston valve and said diaphragm to hold said valve in an "at-rest" position under one set of conditions and in a "deflected" position, under a second set of conditions, a pair of longitudinally spaced, laterally directed orifices communicating with the air stream through said ramjet missile at the optimum position of said shock wave in the vicinity of the forward end of said ramjet missile and connected to said diaphragm chamber on opposite sides of said diaphragm, a source of high-pressure air communicating with the first piston valve at its central portion, a second piston-valve system having a valve, a diaphragm chamber, a diaphragm and a snap spring, a static-pressure orifice connected through a constriction with one side of said diaphragm chamber of the second piston-valve system and with the extremities of the first and second-piston-valve cylinders, a combustion-chamber-pressure orifice also connected through a constriction of the same side of said second diaphragm chamber, a connection between the other side of said second diaphragm chamber and one of said aforementioned longitudinally spaced orifices at the shock-wave position, a transfer duct communicating with the center of said second piston valve and being so located with respect to said first piston valve as to communicate with the central portion thereof when said valve is in "at-rest" position and to communicate with one end of said valve cylinder when the valve is in "deflected" position, and a pair of inlet ducts between said second piston valve and opposite ends of said fuel-valve-operating cylinder, said inlet ducts being so located with respect to the second piston valve as to permit one to communicate with the central portion thereof with the piston in "at-rest" position, and the other to do so with said piston in "deflected" position.

References Cited in the file of this patent

UNITED STATES PATENTS

| | | |
|---|---|---|
| 2,540,594 | Price | Feb. 6, 1951 |
| 2,550,678 | Deacon | May 1, 1951 |
| 2,688,841 | Decher et al. | Sept. 14, 1954 |
| 2,697,327 | Hazen | Dec. 21, 1954 |